June 2, 1942.  R. W. GROOT ET AL  2,285,201
DYNAMO-ELECTRIC APPARATUS
Original Filed Sept. 22, 1939
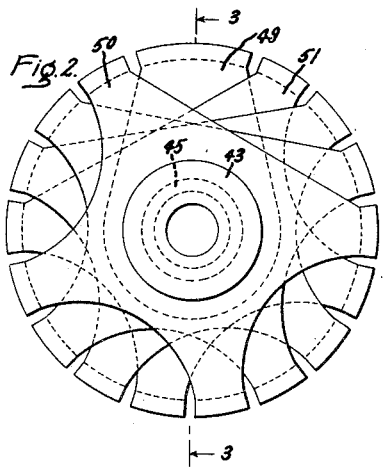
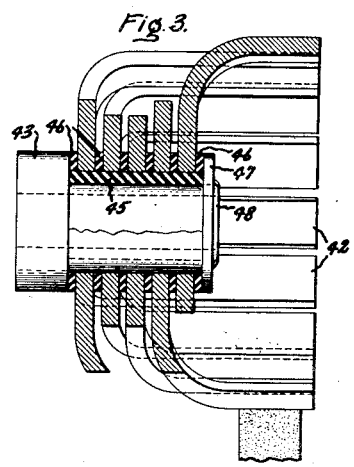
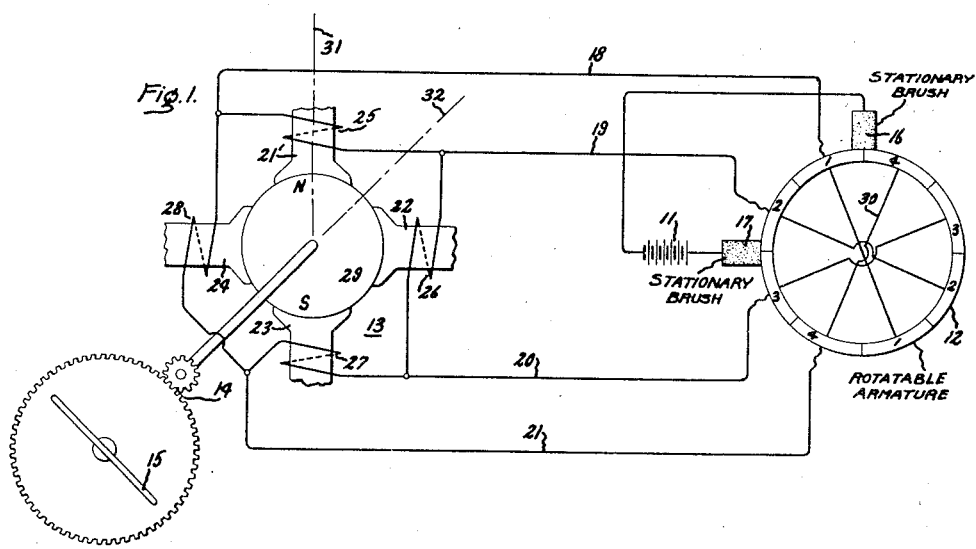
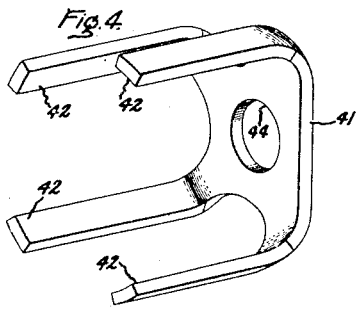
Inventors:
Robert W. Groot,
Lawrence F. Hemphill,
by Harry C. Dunham
Their Attorney.

Patented June 2, 1942

2,285,201

UNITED STATES PATENT OFFICE 2,285,201

DYNAMOELECTRIC APPARATUS

Robert W. Groot and Lawrence F. Hemphill, Fort Wayne, Ind., assignor to General Electric Company, a corporation of New York Original application September 22, 1939, Serial No. 296,087, now Patent No. 2,264,076, dated November 25, 1941. Divided and this application August 5, 1941, Serial No. 405,470

1 Claim. (Cl. 171—321)

This application is a division of our copending application, Serial No. 296,087, filed September 22, 1939, patented Nov. 25, 1941, No. 2,264,076.

Our invention relates to telemetering and the transmission of rotary motion.

It is an object of our invention to provide an improved, simple, rugged method and apparatus for producing rotary motion especially doing so with a relatively large number of possible intermediate steps or positions of rest.

It is also an object of our invention to provide a simplified easily manufactured commutator.

Other and further objects and advantages will become apparent as the description proceeds.

In accordance with our invention in its preferred form we utilize an arrangement changing electrical connections for transmitting rotary motion from a transmitting point to a receiving point. At the receiver we provide an element similar to an electric motor with a two-pole rotor and a stator having more than a single pair of poles. Between the transmitting and receiving points we provide a plurality of control wires equaling the number of poles at the receiver stator. At the transmitting point we provide a current source and a commutator arranged in such a manner as to vary the electrical connections of the control wires to the receiver stator poles and provide a greater number of positions of rest for the rotor than there are stator poles in the receiver.

Our invention will be understood more readily from the following detailed description when considered in connection with the accompanying drawing and those features of the invention which are believed to be novel and patentable will be pointed out in the claim appended hereto. In the drawing Figure 1 is an electrical circuit diagram including a schematic representation of elements in a rotary motion transmitting system forming one embodiment of our invention. Figure 2 is an end view of a modified form of commutator which may be employed in a system of the type illustrated in Figure 1. Figure 3 is a side view partially in cross-section of the apparatus of Figure 2, represented as being cut by a vertical center plane 3—3, and Figure 4 is a perspective view of one of the commutator bar elements or shells of the commutator shown in Figures 2 and 3. Like reference characters are utilized throughout the drawing to designate like parts.

The system illustrated in Figure 1 comprises an energizing current source 11, a transmitter in the form of a commutator 12, a receiver 13, and a speed reduction gear 14. The current source 11 may be either alternating-current or direct-current, but is preferably a direct current source if a permanently magnetized rotor is to be utilized in the receiver. It will be assumed that a rotatable element such as a shaft, control knob, or instrument pointer, the rotation of which is to be reproduced, is connected to the commutator 12 and that the element which is to be rotated in response to the transmitter is connected to the transmission gearing 14. Such an element may take the form of a telemeter-receiver indicating pointer, a swiveling vane or plate 15 of a throttle valve, or some other element adapted to be rotated.

The transmitter commutator consists of a plurality of groups of cross-connected commutator bars or segments, the number of bars in such groups being equal to the number of stator poles in the receiver. For example, in the arrangement shown in Figure 1 there are four pairs of commutator bars numbered 1 to 4, consecutively. The diametrically opposite commutator bars of each pair which are numbered alike are electrically connected. The several pairs of bars, however, are insulated from each other. For supplying current to the commutator 12 a pair of brushes 16 and 17 is provided. The angular width of the brushes is made less than that of the commutator bars and angular spacing between the brushes 16 and 17 is made half the angular spacing between cross-connected commutator bars. In this case, the angular spacing between brushes is 90 degrees since the cross-connected bars are diametrically opposite each other in the commutator. Four control wires 18, 19, 20 and 21 are provided, one for each of the pairs of commutator bars, and each of the control wires is connected to a different one of the pairs of commutator bars.

The receiver includes a stationary member having a plurality of poles and may, if desired, consist of a stator of a multi-polar motor. Only the poles 21', 22, 23 and 24 of the receiver stator are shown and it will be understood that suitable magnetic return yokes are provided. The poles 21' to 24, inclusive, carry the exciting windings 25 to 28, respectively. The windings are connected in series such that a current flowing continuously through the series circuit would tend to magnetize all the poles with the same polarity. The control wires 18–21, inclusive, are connected to the junction points between the stator windings 25–28, inclusive.

The rotor of the receiver 13, however, is provided with fewer poles than the stator, for example, with half as many poles, and in the case illustrated, a two-pole rotor 29 is provided. The rotor 29 may be magnetized in any manner giving it adequate magnetic strength. However, for the sake of maximum simplicity and reliability, we prefer to employ a rotor in the form of a transversely magnetized cylindrical permanent magnet composed of high-coercive-force permanent magnet material. The material of which the rotor 29 is composed may have a composition, for example, of approximately 20% nickel, 12% aluminum, 5% cobalt, and 63% iron.

For the purpose of increasing the number of steps which may be provided in the rotation of the valve plate 15, the speed reduction gearing 14 may be employed. As will be explained hereinafter, the use of a four-pole stator, in itself, provides eight steps or positions of rest of the rotor 29. By employing a gearing having a speed reduction of approximately 5 to 1, as shown, forty possible positions of rest of the valve plate 15 are provided. In such applications as the remote control of throttle valve positions in rear-engine automotive vehicles, it has been found that from 16 to 32 steps or positions of rest are both desirable and satisfactory.

The manner of operation of the rotary motion transmitting system will be apparent from a consideration of its circuit diagram. When the commutator 12 is in the position shown, with respect to the brushes 16 and 17, the brushes each bridge a pair of commutator segments. Current will flow from the brush 16 through the segment 1, the conductor 18, the stator field winding 25, back through the conductor 19, the segment 2, and the brush 17 to the current source 11. Similarly a parallel circuit will be formed from the brush 16 through the segment 4, the cross connection 30, the opposite segment 4, the conductor 21, the stator field winding 27, the conductor 20, the segment 3 and the brush 17 back to the current source 11, owing to the fact that the brushes 16 and 17 each bridge a pair of commutator segments. The stator field windings 26 and 28 will be shunted out and no field current will flow in them. The currents flowing in the windings 25 and 27 will produce flux in the same direction through the poles with respect to the diameter of the rotor. That is, the pole pieces 21 and 23 will be oppositely polarized so as to draw the rotor 27 in the position shown with the rotor poles along a vertical line. The line of polarization of the rotor is represented by the center line 31.

If the brushes 16 and 17 are rotated 22½ degrees counterclockwise, which is one half bar width, or if the brushes are kept stationary and the commutator 12 is rotated the same distance in the clockwise direction, new electrical connections will be made. Then current will flow from the brush 16 through the segment 1, the conductor 18, the winding 25, the winding 26, the conductor 20, the commutator segment 3 and the brush 17 back to the current source 11. In a similar manner current will flow through the windings 28 and 27 in series causing the poles 21 and 22 to be polarized with the same polarity, and the poles 23 and 24 to be polarized with the opposite polarity from the poles 21 and 22. Consequently the line of magnetization of the stator will be shifted 45 degrees to the right represented by the center line 32 and the rotor 29 will take up a new position with its magnetic axis shifted 45 degrees, or ⅛ of a revolution. By successively shifting the relative angular position of the armature and brushes to further increments of ½ commutator bar width, further 45-degree rotations of the rotor 29 may be produced so that without the use of speed reduction gearing a system may be employed for producing rotation in eight definite steps or different stable positions of rest. With the speed reduction gearing 14 the number of definite positions may be multiplied in accordance with the ratio of reduction.

For the sake of increased ruggedness and durability, the commutator 12 may be made with the cross-connected bars or segments of the cross connections integral, as illustrated in Figures 2 and 3. In the arrangement of Figures 2 and 3, however, each group of cross-connected commutator bars is shown as consisting of four bars instead of only a pair of bars. Each such group may consist of a shell of copper or other suitable conducting material, as illustrated in Figure 4, comprising a yoke portion 41 providing cross connections, and wing portions 42 serving as the commutator bars or segments. In the arrangement illustrated four such shells are provided and they are mounted upon a spindle or collar 43 (Fig. 3) with the wing portions 42 interleaved. The yoke portions 41 are provided with openings 44 which may be pressed onto an insulating cylinder or sleeve 45 secured to the supporting spindle or collar 43. Insulating washers 46 are placed between the successive yoke portions 41 and at the ends in order to insulate the commutator shells from one another. Since the yoke portions 41 are axially stacked, it will be understood that the wing portions 42 of the successive shells are preferably stepped in length. The shells may be secured to the collar 43 in any desired manner as by means of a washer 47 and rivets 48, or if desired, a molded spindle including insulating material 45 and 46 may be provided with the yoke portions 41 molded in place as inserts.

In order that a dead position may be provided in which the current source 11 is disconnected and consumption of electrical energy, when not needed, is prevented, an additional commutator segment 49 may be provided which is not connected to any of the control wires 18–21, inclusive, but is interposed between two of the active segments 50 and 51 (Fig. 2). If the dead segment 49 is provided, it will be understood that the angular spacing of the other segments will have to be modified slightly. Three of the angular spacings between the commutator segments or wing portions 42 of each shell may be slightly less than 90 degrees, and each of the remaining spacings may be made slightly more than 90 degrees. It will be observed that in the construction of Figures 1, 2 and 3 it is unnecessary to provide insulating segments between commutator bars, and accordingly, there is no necessity whatever for undercutting commutator insulating segments. Furthermore, the possibility of short-circuiting dust or chips settling in grooves between commutator bars is practically eliminated.

We have herein shown and particularly described certain embodiments of our invention and certain methods of operation embraced therein for the purpose of explaining its principle and showing its application but it will be obvious to those skilled in the art that many modifications and variations are possible and we aim, therefore, to cover all such modifications and variations as fall within the scope of our invention which is defined in the appended claim.

What we claim as new and desire to secure by Letters Patent of the United States is:

A commutator comprising a plurality of copper shells each having a yoke for supporting commutator bars and providing cross connections, each shell having wings connected to the yokes and serving to form commutator bars, said shells being assembled with the yokes axially stacked and the segment-forming wings angularly interleaved, said yokes being secured together with a common support and insulated from each other, and said segments being spaced to avoid electrical contact.

ROBERT W. GROOT.
LAWRENCE F. HEMPHILL.